United States Patent
Mangalam

(10) Patent No.: US 6,826,493 B1
(45) Date of Patent: Nov. 30, 2004

(54) SYSTEM AND METHOD FOR REAL TIME DETERMINATION OF UNSTEADY AERODYNAMIC LOADS

(75) Inventor: Siva M. Mangalam, Williamsburg, VA (US)

(73) Assignee: Tao of Systems Integration, Inc., Hampton, VA (US)

(*) Notice: Subject to any disclaimer, the term of this patent is extended or adjusted under 35 U.S.C. 154(b) by 0 days.

(21) Appl. No.: 10/653,494

(22) Filed: Sep. 2, 2003

(51) Int. Cl.[7] ............................................. G01F 1/00
(52) U.S. Cl. ........................ 702/45; 73/170.12; 73/147
(58) Field of Search ....................... 702/45; 73/170.12, 73/147

(56) References Cited

U.S. PATENT DOCUMENTS

| | | | |
|---|---|---|---|
| 4,229,725 A | 10/1980 | Reilly | 340/968 |
| 4,563,684 A | 1/1986 | Maris | 340/966 |
| 4,649,387 A | 3/1987 | Maris | 340/966 |
| 4,727,751 A | 3/1988 | Holmes et al. | 73/147 |
| 4,848,153 A * | 7/1989 | Stack et al. | 73/432.1 |
| 4,932,610 A | 6/1990 | Maestrello | 244/203 |
| 4,936,146 A * | 6/1990 | Stack et al. | 73/432.1 |
| 5,074,147 A | 12/1991 | Sarma | 73/204.15 |
| 5,209,111 A * | 5/1993 | Agarwal et al. | 73/147 |
| 5,218,863 A | 6/1993 | Mangalam | 73/147 |
| 5,299,455 A | 4/1994 | Mangalam | 73/180 |
| 5,600,060 A | 2/1997 | Grant | 73/147 |
| 5,796,612 A | 8/1998 | Palmer | 701/4 |
| 5,890,681 A | 4/1999 | Meng | 244/205 |
| 6,134,959 A | 10/2000 | Mangalam et al. | 73/170.12 |
| 6,169,496 B1 | 1/2001 | Martin et al. | 340/966 |
| 6,253,126 B1 | 6/2001 | Palmer | 701/14 |
| 6,390,417 B1 | 5/2002 | Yoshino | 244/203 |
| 6,424,923 B1 | 7/2002 | Huyer et al. | 702/45 |

OTHER PUBLICATIONS

S. Mangalam, "Real–Time Extraction of Hydrodynamic Flow Characteristics Using Surface Signatures", *Proceedings 13th International Symposium on Unmanned Untethered Submersible Technology*, Aug. 24–27, 2003.

S. Mangalam, "Phenomena–Based Real–Time Aerodynamic Measurement System (PRAMS)", *2003 IEEE Aerospace Conference Proceedings*, Mar. 8–15, 2003.

\* cited by examiner

Primary Examiner—John Barlow
Assistant Examiner—Anthony Dougherty
(74) Attorney, Agent, or Firm—Hunton & Williams LLP

(57) ABSTRACT

A method is provided for determining a load on an object immersed in a fluid stream under a set of flow and attitude conditions associated with unsteady flow phenomena. The method comprises measuring surface heat transfer at a plurality of surface locations on the object under the flow and attitude conditions to provide a set of heat transfer data. The heat transfer data are used to determine an indicator surface location of at least one critical flow feature indicator. The method further comprises calculating a load coefficient using the indicator surface location of the at least one critical flow feature indicator and calculating the load from the load coefficient and the flow and attitude conditions.

34 Claims, 14 Drawing Sheets

SYSTEM AND METHOD FOR REAL TIME DETERMINATION OF UNSTEADY AERODYNAMIC LOADS

FIELD OF THE INVENTION

The invention relates generally to the measurement of aerodynamic and hydrodynamic loads and, more particularly, to determination of unsteady aerodynamic and hydrodynamic loads in real time.

BACKGROUND OF THE INVENTION

Determination of aerodynamic forces and moments on an aircraft is critical to aircraft design. Aerodynamic loads and moments predicted by theoretical models, however, generally differ from the loads and moments experienced under actual flight conditions, largely due to the dominating role of viscous effects and their interactions with the structure. To make matters worse, current aircraft aerodynamic models used in simulation and control law development are weak in the area of unsteady flow effects. The most difficult problem in developing accurate and reliable mathematical models to predict and estimate unsteady aerodynamic characteristics is associated with the inability to accurately measure and quantify viscous effects. These problems are compounded in unsteady flows by the nonlinear interactions of viscous, inertial, and aero-elastic effects.

Except for gross flight parameters like speed, accelerations, pressure, and temperature, aircraft flight characteristics are usually obtained through derived quantities, primarily from structural response to actual aerodynamic loads, which are typically measured using strain gages, accelerometers, and the like. The accuracy of these determinations may be significantly affected, however, by any time lag between the aerodynamic phenomena (the cause) and the response of the aircraft structure (the effect). Furthermore, accurate interpretation of the structural response depends on the quality of the model used to represent the structural deflections/strains as a function of the imposed loads.

There is accordingly a need for a method for determining aerodynamic and hydrodynamic loads in real time independent of any structural response to such loads.

SUMMARY OF THE INVENTION

In one aspect, the invention provides a method for determining a load on an object immersed in a fluid stream under a set of flow and attitude conditions associated with unsteady flow phenomena. The method comprises measuring surface heat transfer at a plurality of surface locations on the object under the flow and attitude conditions to provide a set of heat transfer data. The heat transfer data are used to determine an indicator surface location of at least one critical flow feature indicator. The method further comprises calculating a load coefficient using the indicator surface location of the at least one critical flow feature indicator and calculating the load from the load coefficient and the flow and attitude conditions.

In another aspect, the invention provides a load determination system for determining a load on an object immersed in a fluid stream under a set of flow and attitude conditions. The load determination system comprises a hot film sensor arrangement having at least one hot-film sensor array appliable to a surface of the object. Each of the at least one sensor array has a plurality of hot-film sensor elements. The load determination system further comprises a constant voltage anemometer arrangement having a plurality of constant voltage anemometer circuits. Each constant voltage anemometer circuit is in communication with an associated hot film sensor element and is configured to provide a signal corresponding to heat transfer from the associated hot film sensor to the fluid stream. The load determination system also comprises a data processing system in communication with the constant voltage anemometer arrangement. A signal receiving portion in the data processing system is in communication with the constant voltage anemometer arrangement for receiving signals from the constant voltage anemometers. A critical flow feature indicator extraction portion in the data processing system is in communication with the signal receiving portion and has software for processing the signals to identify the location of one or more critical flow features on the surface of the object. A load determination portion in the data processing system is in communication with the critical flow feature indicator extraction portion and has software for calculating a load magnitude for at least one load on the object using the location of one or more critical flow features.

DETAILED DESCRIPTION OF THE INVENTION

Figure 1:
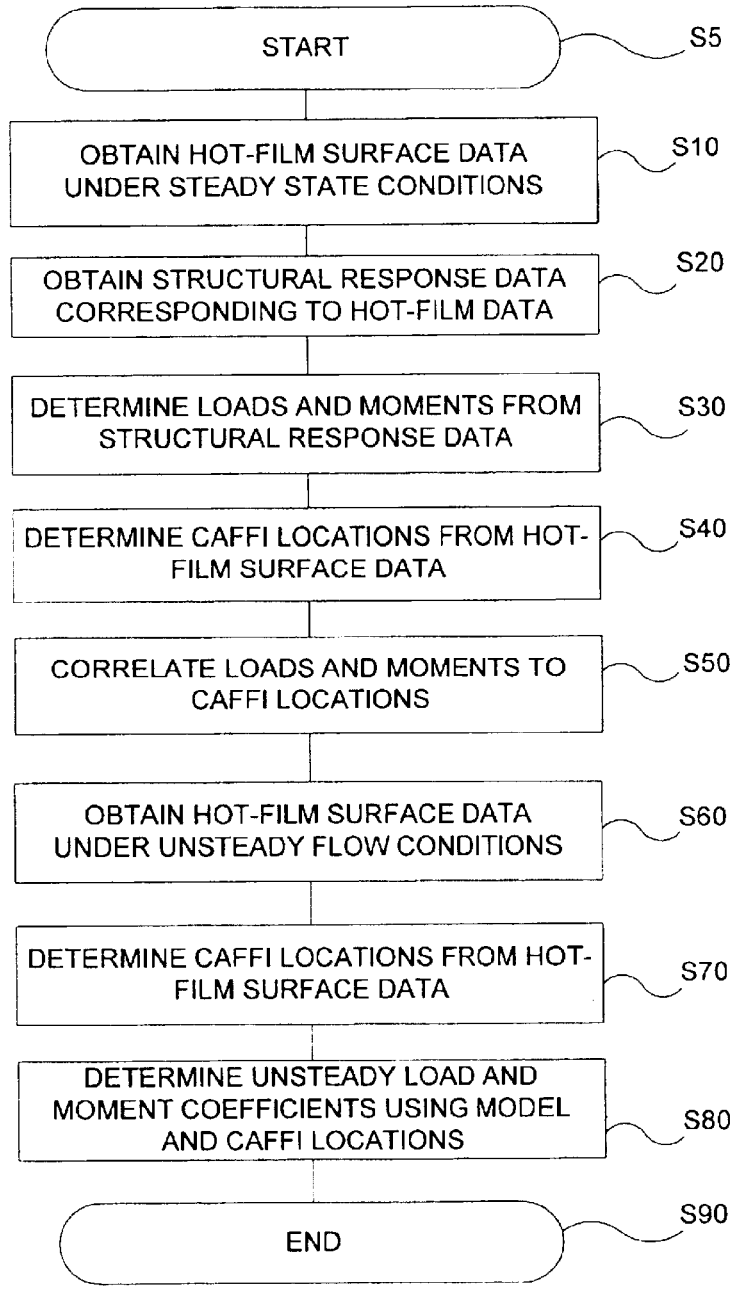
FIG. 1 is a flow diagram of a method for determining a load on an object in a flow stream according to an embodiment of the invention.

As noted above, the difference between actual aerodynamic and hydrodynamic loads/moments and loads/moments predicted by theoretical models can often be traced to the dominating role of viscous effects and their interactions with the structure. These effects include:

1. Energy (and momentum) loss due to viscous effects;
2. Change in circulation due to changes in flow angularity at the leading-edge region and the location of flow separation (vortex lift-off) and reattachment points;
3. Inertial effects that introduce time (and phase) lag between instantaneous and measured quantities as a result of accelerations and decelerations of the body and the surrounding flow field; and
4. Aero-elastic effects (flutter) and buffeting due to fluid-structure interactions. These effects can play a dominant role in the performance, safety, and control of aerospace vehicles. Aviation accidents are often attributed to such phenomena as buffet, flutter, wind shear, gusts, etc., all of which are related to unsteady aerodynamic effects.

Heretofore, characterization of the effects of unsteady loads on aircraft structures has required costly wind tunnel and flight testing, which must be used to establish the effect of unsteady aerodynamic variables for each aircraft configuration. Loads and moments are generally obtained in terms of structural responses to various flow conditions using load cells, strain gages, accelerometers, and pressure transducers. The aerodynamic variables and their derivatives are usually computed from these measurements using advanced parameter estimation and system identification techniques.

Such test data determinations suffer from the time delay between the occurrence of rapid unsteady flow phenomena and data acquisition by load-measurement systems that depend on relatively slow structural response. Furthermore, complete characterization requires that structural response testing be conducted at all conceivable flight conditions. To avoid the necessity of such exhaustive testing, there is a tendency toward non-optimum design approaches such as limiting the safe flight envelope or designing in highly conservative structural safety factors.

The methods of the present invention overcomes these problems by correlating aerodynamic loads and moments to flow data that can be measured without regard to structural response. These methods involve correlating unsteady aerodynamic loads and moments to surface hot-film signatures for conventional and vortex-dominated flows. Surface-mounted hot-film micro-sensors are used to identify the occurrence of and spatially locate one or more critical aerodynamic flow feature indicators (CAFFIs) that can be directly related to unsteady flow phenomena. Using these sensors, CAFFIs can be identified for such phenomena as laminar-to-turbulent transition, flow separation and reattachment regions, vortex dynamics, and skin-friction distribution. Unsteady aerodynamic loads and moments can then be obtained as a polynomial function of CAFFI parameters.

It will be understood by those of ordinary skill in the art that the methods of the present invention apply to all fluid flow regimes. Thus, although the term "aerodynamic" is used throughout in describing the embodiments of the invention, the invention may also be used in hydrodynamic applications or applications involving any other fluid flow regime.

FIG. 1 illustrates a general method for developing and using CAFFIs to provide unsteady dynamic loads on a vehicle or other object in real time. The method begins at step S5. At steps S10 and S20, surface data and corresponding structural response data are obtained in tests conducted at steady-state conditions. Data are obtained for a variety of flow conditions and may be obtained in actual flight or in wind tunnel testing. As will be discussed in more detail hereafter, the surface data are obtained using hot film instrumentation applied to the surfaces of a test vehicle or subscale model. This instrumentation makes use of thin film sensors similar to those described in U.S. Pat. No. 5,218,863 and constant voltage anemometers of the type described in U.S. Pat. No. 5,074,147, both of which are incorporated herein by reference in their entirety. Corresponding structural response data may be obtained using conventional instrumentation and techniques such as pressure distribution, mechanical measurement and strain gage balance.

At step S30, the structural response data are used to obtain forces and moments as a function of angle of attack and/or other flight variables. These forces and moments can be used to calculate non-dimensional force and moment coefficients such as lift coefficient $C_l$, drag coefficient $C_d$ and moment coefficient $C_m$ using the known flight conditions (e.g., fluid density, $\rho$ and flow velocity, V) and vehicle or model reference parameters (e.g., mean aerodynamic chord, C). At step S40, CAFFI locations on the surface of the vehicle or model are identified for the various flow conditions using the hot-film surface measurements and analytical methods that are discussed in more detail below. As will be discussed, the CAFFI locations identified may include leading edge stagnation point (LESP), flow separation point (FSP), laminar-to-turbulent transition point (LTTP) and flow reattachment point (FRP). Each of these locations may be expressed as a fraction of a geometric dimension such as the mean aerodynamic chord of the vehicle or model.

At step S50 the steady state load and moment coefficients are correlated with the CAFFI locations to develop a mathematical model that expresses aerodynamic force and moment coefficients as polynomial functions of CAFFI locations. These polynomial expressions can then be used to obtain aerodynamic force and moment coefficients under unsteady flow conditions. To accomplish this, hot-film instrumentation on the vehicle or model is used at step S60 to obtain surface data under unsteady flow conditions. At step S70, these data are used to determine CAFFI locations under these conditions. At step S80, the load correlation model is applied to the unsteady flow CAFFI locations to determine load and moment coefficients for the unsteady flow conditions. The method ends at step S90.

The response time of the hot-film instrumentation and the processing time required to determine load and moment coefficients from the hot-film data are so short that loads and moments associated with unsteady flow phenomena can be determined in real time. Real-time unsteady load coefficients can then be used by a vehicle control system to virtually instantaneously command control surfaces in response to these phenomena.

It will be understood that as used herein, the term "load coefficients" includes non-dimensional load coefficients such as lift and drag coefficient as well as moment coefficients such as pitching moment coefficient. Similarly, the term "load" encompasses both loads and moments.

Surface Data Instrumentation

The instrumentation used to obtain surface data in methods according to the invention uses measurement of heat transfer from thin film sensors placed on the surface of a body to identify and accurately locate changes in the flow pattern over that surface. These sensors use the principle that the resistance of a thin, hot-film element is a function of the geometry of the element and its operating temperature. The sensor element can be heated to a value above the stagnation temperature of the ambient flow to establish a temperature gradient between the sensor element and the ambient flow. This gradient causes heat to be transferred to the flow by convection and to the substrate through conduction. The heat lost to the flow through convective heat transfer may be used to measure surface flow conditions.

Figure 2:
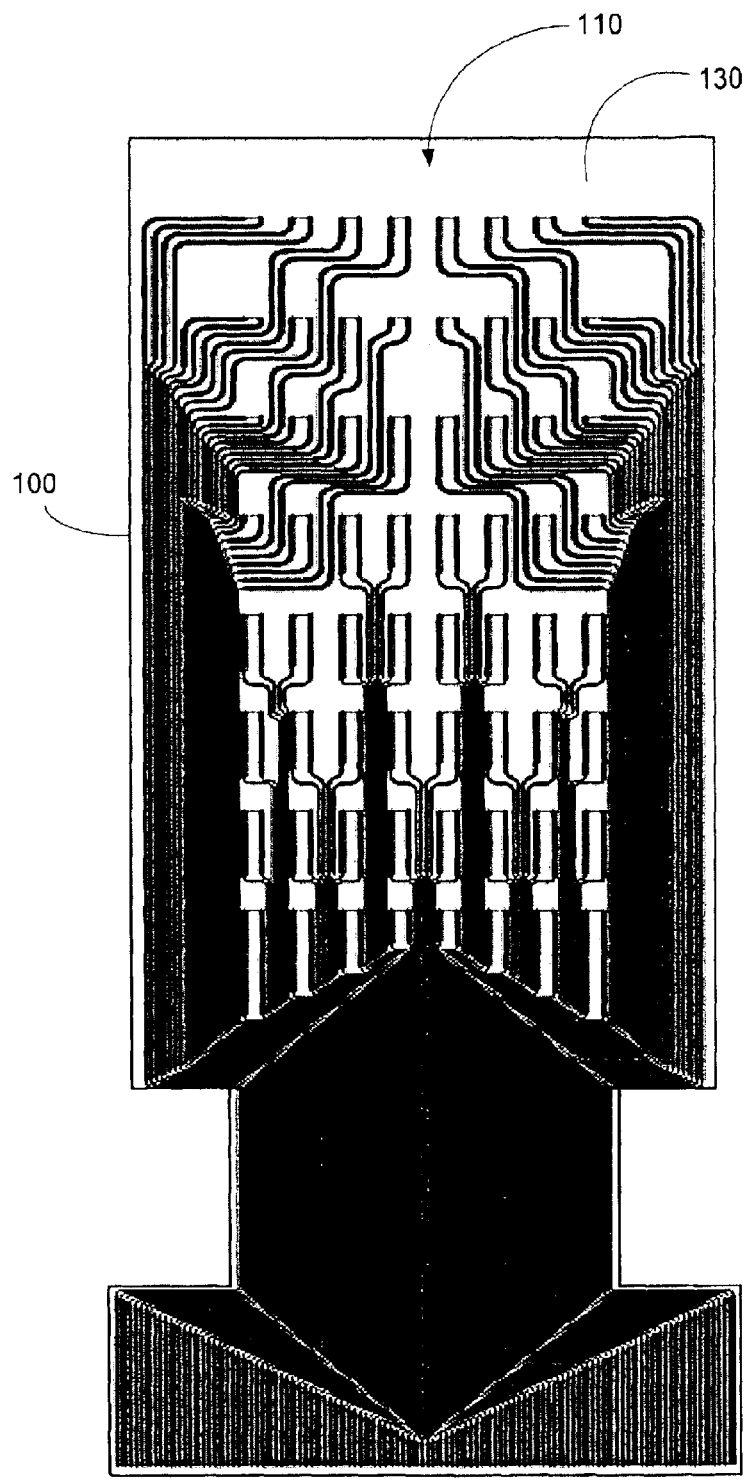
FIG. 2 is a plan view of a hot-film sensor array that may be used in the systems and methods of the invention.
Figure 3:
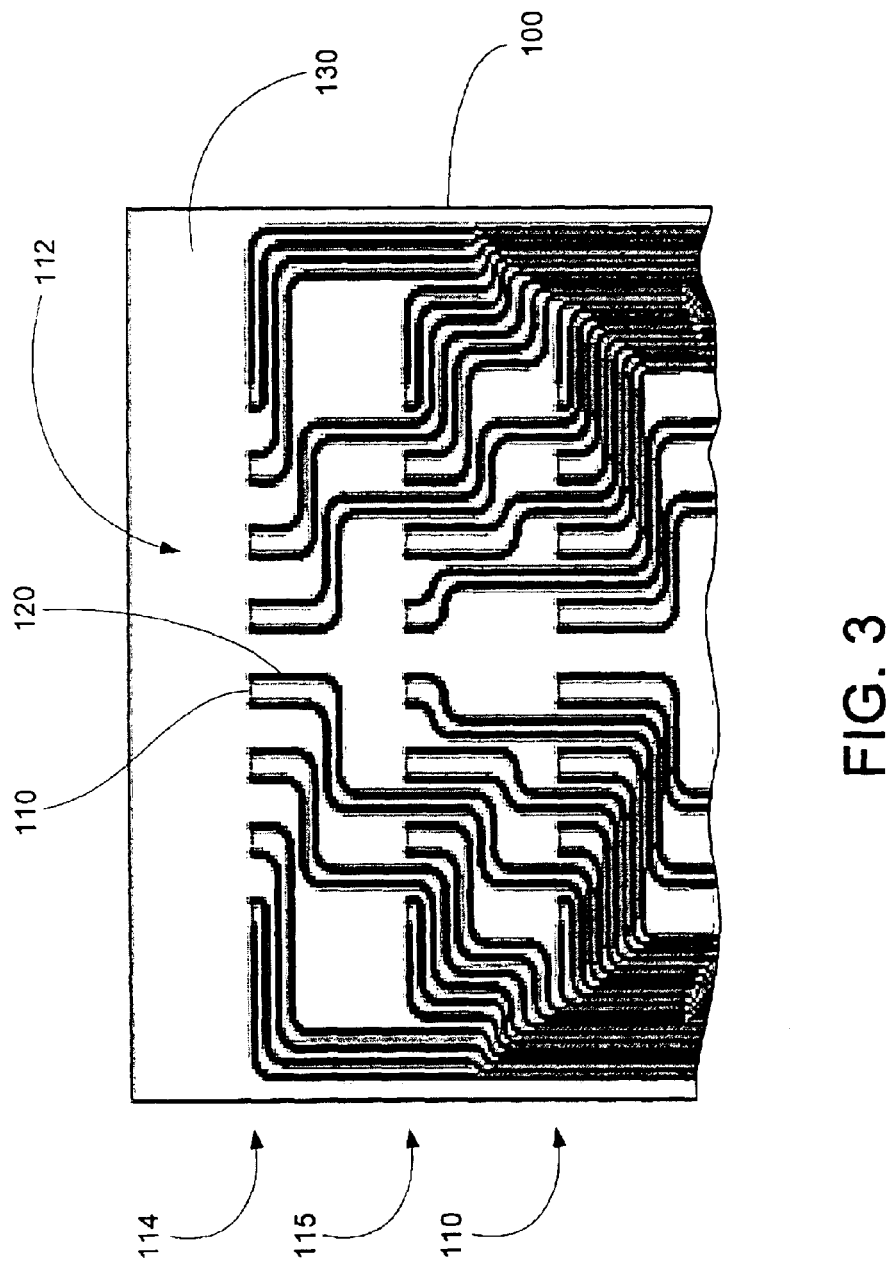
FIG. 3 is an expanded view of a portion of the hot-film sensor array of FIG. 2.
Figure 4:
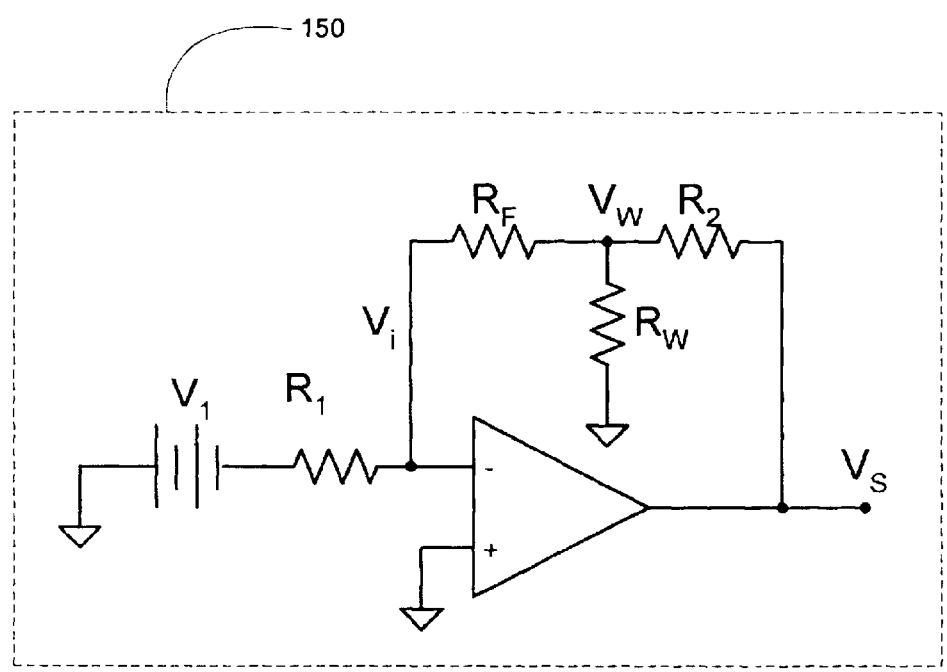
FIG. 4 is a circuit diagram of a constant voltage anemometer that may be used in systems and methods of the invention.

With reference to FIGS. 2 and 3, a typical sensor array 100 may consist of a one or more 0.25-micron nickel-sensor elements 110 and a plurality of 2-micron-thick copper leads 120 vacuum deposited on a flexible, insulated substrate 130. These sensors are arranged as per user requirement. For example, the sensor array 100 shown in FIGS. 2 and 3 is made up of a matrix 112 of eight rows and eight columns of sensor elements 110. The first three rows 114, 115, 116 of sensor elements 110 are shown in FIG. 4. Such configurations are useful for measuring surface signatures on a three-dimensional body with flow changes occurring in both the streamwise and crossflow directions. A simpler array with sensor elements arranged only in the streamwise direction may be used if only two-dimensional flow is involved. The size of the sensor array is unlimited and will generally be a function of the model size and the spatial resolution required to establish an accurate correlation of loads to CAFFI location.

Constant Voltage Anemometer

A hot-film sensor of the type described above may be used in conjunction with a constant voltage anemometer (CVA) of the type described in U.S. Pat. No. 5,074,147. Until 1990, there were primarily two types of anemometers: constant current anemometers (CCA) and constant temperature anemometers (CTA). The former maintained a sensor at a prescribed constant current by suitably changing the voltage across it to account for changes in resistance resulting from changes in temperature attributable to convective heat transfer. In contrast, a CTA maintains the sensor at a constant resistance, and thus, at a constant temperature. These two types of anemometers were extensively used in fluid mechanics research for over seven decades.

Constant current and constant temperature anemometers, however, have inherent problems. For example, they require frequent fine-tuning to deal with changes in ambient conditions. They are also susceptible to the adverse impact of electromagnetic interference (EMI) and radio frequency interference (RFI). These and other shortcomings (e.g., susceptibility to cable capacitance effects) have restricted their use primarily to research under controlled laboratory conditions. They have found some limited application in flight-testing with the introduction of additional complex circuitry. However, great care is required in operating them do to the change in ambient conditions with altitude. Overall, conventional thermal anemometry has remained primarily a laboratory tool.

Unlike CCAs and CTAs, constant voltage anemometers have fewer applicational limitations. A basic CVA circuit 150 where no compensation is applied for the thermal inertia of the sensor is shown in the schematic diagram of FIG. 4. In this diagram, the resistance of the sensor is shown as $R_W$ and the voltage across the sensor is $V_W$. The circuit is powered by a stable constant voltage source $V_f$. The hot-film sensor is placed in the feedback of the op-amp A. In the linear operating region, the voltage $V_W$ across the sensor is given by $$V_W = (R_F/R_I) V_I \qquad \text{Eq. 1a}$$

It can be seen that $V_W$ is independent of the sensor resistance $R_W$, making it a constant voltage operation. Any change in the hot-film sensor resistance $R_W$ due to fluid flow produces a current change in the hot-film sensor, the path for which is only through the resistor $R_2$ of the circuit. The resistance change and the current change in the wire with voltage across the wire remaining constant is given by $$i_W R_W = -r_W I_W \qquad \text{Eq. 1b}$$

where the lower case i and r represent current and resistance perturbations.

Accordingly, the voltage $V_W$ across a hot-film sensor with initial resistance ($R_W$) is maintained constant. Changes in sensor temperature due to changes in flow conditions at the sensor location result in changes in its resistance and a corresponding change in the current through the sensor. This change in current is dropped across a large resistor $R_2$ to produce a large output voltage. Thus the circuit produces a large front-end sensitivity. The bandwidth of the system is large because it depends primarily on the open-loop gain of the op-amp A.

The CVA design has been successfully used in a number of wind tunnel, water tunnel, ocean, and flight tests covering the entire speed range from low subsonic to hypersonic. CVAs do not require critical adjustments to account for changes in flow conditions. Further, they provide a flat, customer-specified bandwidth, have high signal-to-noise ratio, and are practically immune to EMI, RFI, and cable-capacitance effects. The CVA technology lends itself to complete hands-off automation and miniaturization. Unlike CTA and CCA, which are primarily laboratory tools, CVA is an engineering tool.

CAFFI Identification

CAFFIs manifest themselves essentially in two ways: (a) Boundary-Layer Transition (transition from laminar to turbulent flow) and (b) Flow Bifurcation (flow separation and reattachment, vortex formation and vortex shedding). The following paragraphs discuss the characteristics and methods of locating CAFFIs associated with these phenomena.

Figure 5:
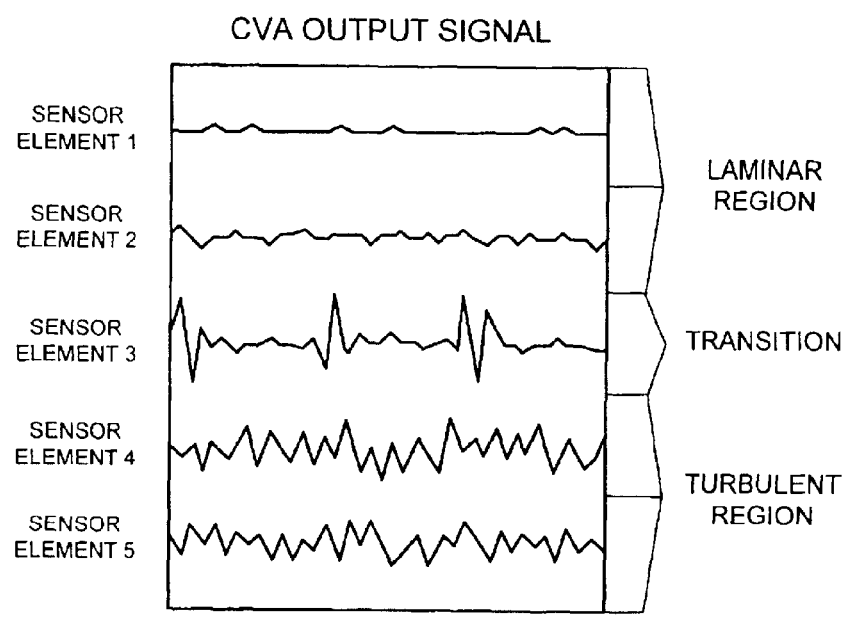
FIG. 5 is a graphical representation of constant voltage anemometer output for five hot-film sensor elements applied to an airfoil.

Boundary-layer transition from laminar to turbulent flow may be determined by applying any of several techniques to the signals received from the CVAs associated with sensor elements on the body. The general approach is illustrated in FIG. 5, which shows the CVA output of five thin film sensor elements arranged in sequence along the surface of an airfoil. For the illustrated flow circumstance, a visual review of the data shows that sensors 1 and 2 are in the laminar flow region, sensors 4 and 5 are in the turbulent region and sensor 3 is at or near the transition from laminar to turbulent. The actual determination techniques applied to the CVA signals to establish the transition point may be based on peak RMS signal, intermittency factor, skewness, flatness, or spectral density. It is well known that signals from the laminar region have very low disturbance (RMS) levels. Also, the mean wall shear stress (skin friction) in a laminar region is much lower than the wall shear stress in the transitional and turbulent regions. This situation translates to lower mean (DC) output voltage levels in the laminar region compared to transitional and turbulent regions. Intermittency level is a normalized expression of relative turbulence levels. It is computed as a ratio of the time duration when the flow is turbulent to the total sample time. According to this criterion, the laminar flow will exhibit nearly zero intermittence whereas a turbulent flow will have an intermittence of nearly one.

By closely spacing a large number of sensors, the above techniques provide a highly accurate analytical determination of the location of the transition point.

Figure 6:
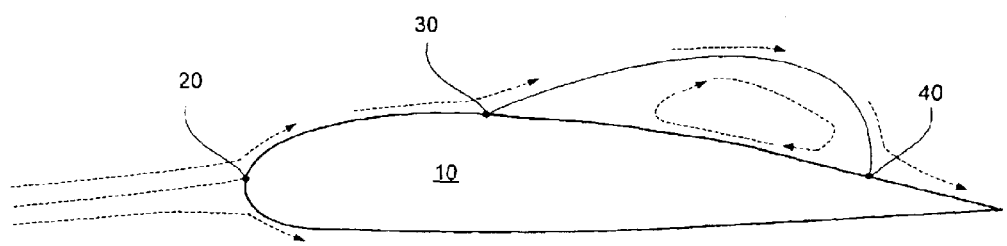
FIG. 6 is a schematic representation of bifurcation flow features for an airfoil.

Flow Bifurcation Points (FBPs) occur when the flow attaches to or separates from the body. Flow separation and vortex shedding occur primarily due to the inability of the flow to negotiate large pressure gradient. Under certain conditions, the separated vortex flow can also reattach itself to the body. FIG. 6 shows an idealized picture of the bifurcation flow features for an airfoil 10. It can be seen that the leading-edge stagnation point (LESP) 20, flow separation point 30, and flow reattachment point 40 all share a common feature: the local streamlines bifurcate in opposite directions. These bifurcations result in a local minimum in shear stress and, accordingly, convective heat transfer.

Figure 7:
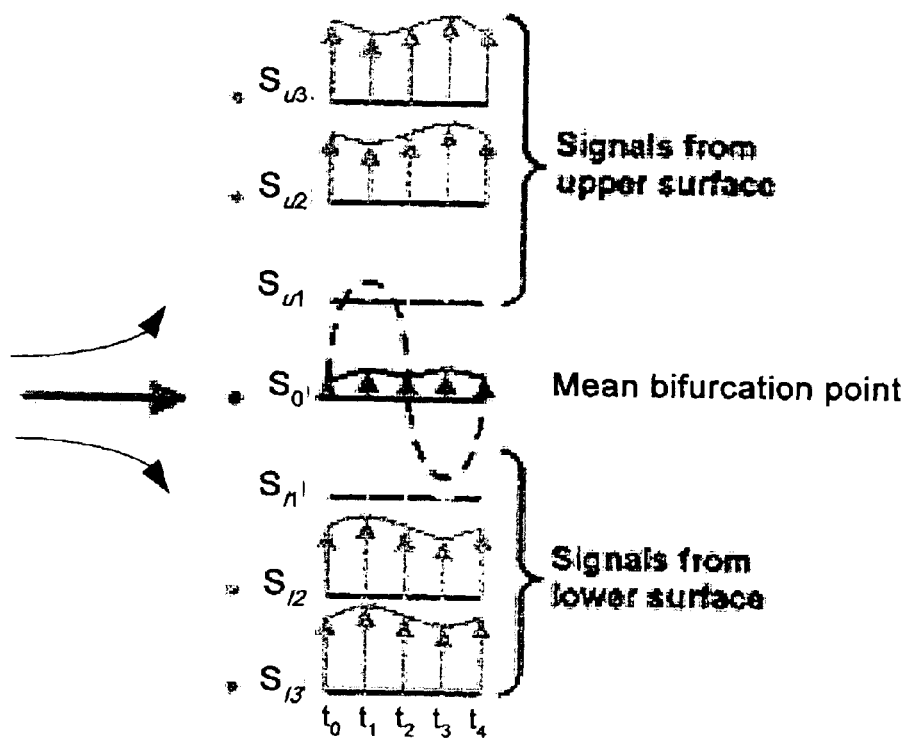
FIG. 7 is a graphical representation constant voltage anemometer output signal behavior in the vicinity of the leading edge stagnation point of an airfoil.

When a hot-film sensor is located at such a point, the convective heat transfer from the sensor will be at a minimum compared to sensors located away from such points. In real flows, FBPs moves back and forth due to flow unsteadiness with corresponding changes in sensor outputs. CVA output signals from hot film sensors located in the neighborhood of FBPs exhibit certain telltale characteristics. FIG. 7 illustrates CVA output signal behavior in the vicinity of the LESP of an airfoil. Sensor $S0$ is located at the mean LESP, sensors $S_{u1}$, $S_{u2}$ and $S_{u3}$ are rearwardly spaced along the upper surface of the airfoil and sensors $S_{l1}$, $S_{l2}$ and $S_{l3}$ are rearwardly spaced along the lower surface of the airfoil. At time $t_0$, when the instantaneous bifurcation streamline is at sensor $s_0$, the CVA output from this sensor has a minimum voltage because there is little heat convection. The other sensors get relatively more cooling because of greater convective heat transfer to the flow. Hence, as the flow accelerates from the LESP, the output voltages from the sensors will increase with rearward distance from the LESP. If at a later time, $t_1$, the instantaneous LESP moved to the sensor location $S_{l1}$, the minimum voltage signal would occur at this sensor location. Similar changes take place for any FBP, as the instantaneous FBP moves back and forth, as shown by the dashed line.

The locus of arrowheads for each sensor location in FIG. 7 represents CVA output signal (time series) at each spatial location. The following features can be observed:

1. The CVA output signal from the sensor located at the mean FBP exhibits the lowest mean output voltage compared to sensors on either side of it.
2. Signals from sensors located on one side of the bifurcation point are in phase
3. Signals from sensors located across FBP exhibit a phase-reversal signature.
4. The sensor located at the mean FBP exhibits a double frequency for every cycle.

Given a sufficient number of sensors, any or all of these features can be used to assist in analytically identifying the location of FBPs on a body.

A similar picture may be obtained in the presence of streamwise or crossflow vortices, which introduce alternate regions of high and low shear stresses. As in the case of FBPs described above, these vortices tend to be unsteady and leave a similar pattern of signals in a direction normal to the direction of the vortices.

Figure 8:
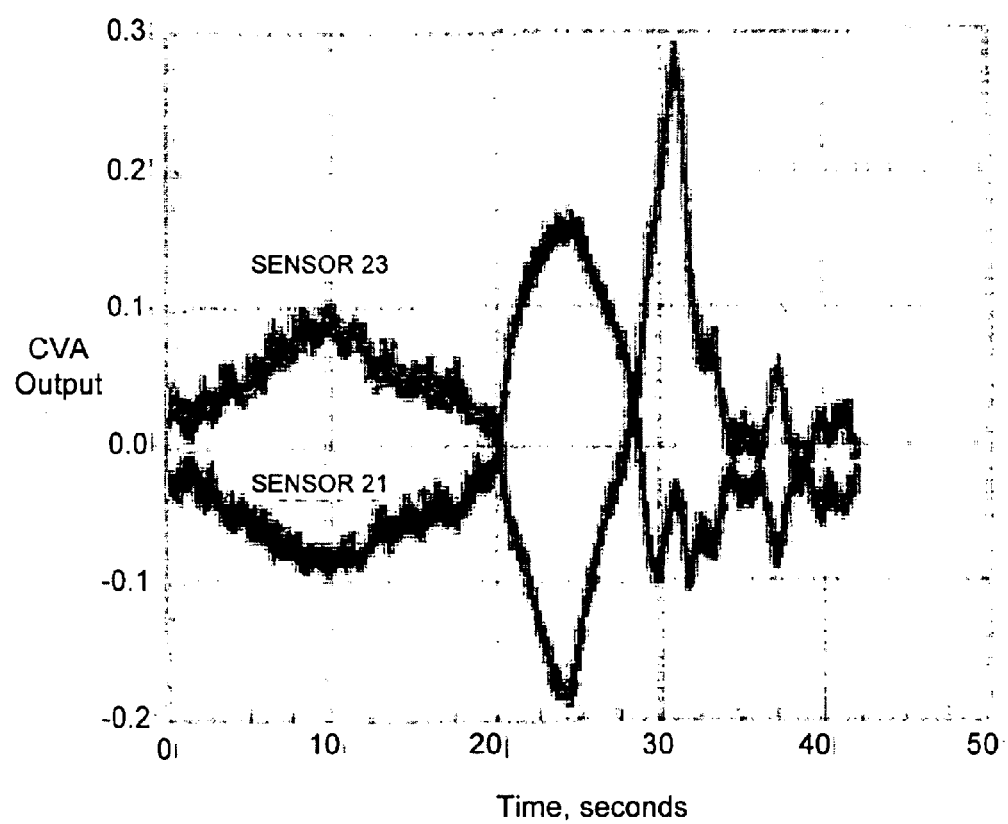
FIG. 8 is a graphical representation of raw constant voltage anemometer signals for two hot-film sensors on an airfoil during an exemplary test flow circumstance.
Figure 9:
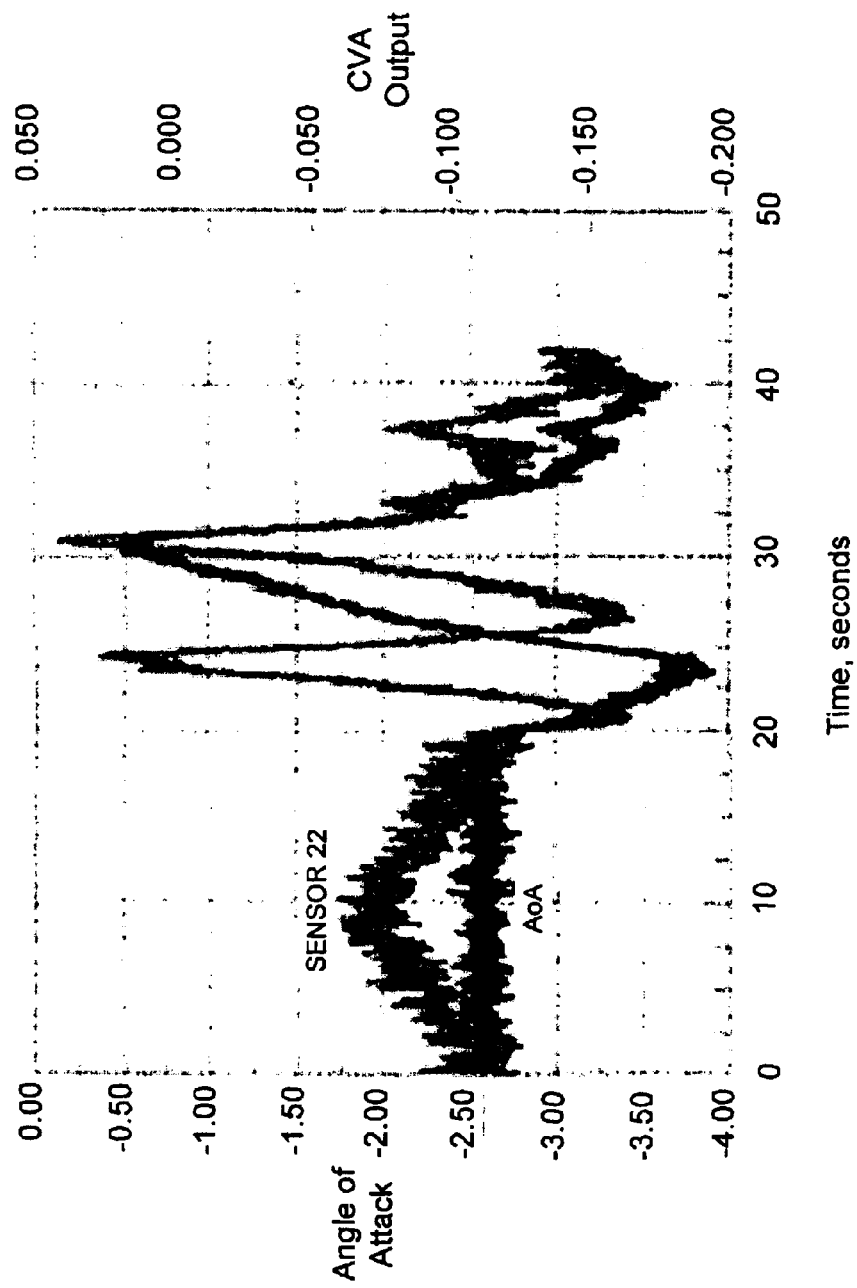
FIG. 9 is a graphical representation of raw constant voltage anemometer signals for a hot-film sensor on an airfoil during an exemplary test flow circumstance.

The FBP features described above were verified in a number of experiments conducted in wind tunnels, in water tunnels, on aircraft in flight, and on ocean-going vessels. In a flight test conducted by NASA Dryden Flight Research Center, hot-film sensors were installed on a transonic airfoil mounted on an F-15B flight test fixture. For this test, an airfoil was instrumented with 60 hot-film sensors arranged from the leading edge to the trailing edge of the upper surface of the airfoil. FIG. 8 shows raw signals from two of these sensors (sensors 21 and 23). FIG. 9 shows the raw signal from the sensor in between these two (sensor 22). The signal traces from the three sensors illustrate the presence of a shock-induced separation at transonic speeds. It is clear that the signals from sensors 21 and 23 are out of phase while the signal from the sensor 22, exhibits a double frequency. It can therefore be concluded that a mean FBP was located at the sensor 22 during the maneuver being conducted at the time of data acquisition. This conclusion was independently verified by simultaneous pressure measurements. It should be noted that the output signal from a sensor decreases as FBP approaches it and the output increases when the FBP moves away from it. Thus, while the shock was initially located between sensors 21 and 23, it first moved forward towards sensor 21 until t=10 seconds (indicated by decreasing voltage) and then moved away (indicated by increasing voltage) from sensor 21 and towards sensor 23. The FBP reached the sensor 23 at t=25 seconds (indicated by minimum voltage) and then moved away from it and back toward sensor 21.

On-line measurement capability to simultaneously obtain all unsteady viscous phenomena on a dynamically pitching airfoil model has been developed and demonstrated. Successful tests were conducted on an NACA 0012 model at IIT (Chicago) and USAFA (Colorado Springs) and on an Eppler-387 model under simulated Martian environment in NASA Langley's supersonic tunnel. In the last of the above three tests, the model was pitched from −12 to +12 degrees in less than 5 seconds.

Skin Friction Distribution

In addition to the flow separation phenomena described above, multi-element hot film sensors and CVAs can also be used to obtain skin friction distribution. Methods have been developed to accurately determine changes in skin friction from a reference condition without calibration. The relationship between the electrical output from a CVA and the fluid mechanical variables are expressed as:

$$P_s/\Delta T = \{a_0 + b_0 \tau_w^{1/3}\} \quad \text{Eq. 2}$$

where, P is the Joule heat dissipated by the hot-film sensor, $\Delta T$ is the difference in temperature between the sensor element and the ambient air, $a_0$ represents conduction loss through the substrate, $b_0$ is a constant, and $\tau_w$ is the wall shear stress.

In a method to determine shear stress using this formula, a constant temperature differential $\Delta T$ is maintained with changes in ambient conditions. This innovation makes it possible to minimize the conduction loss ($a_0$) and keep it a constant. The constant $a_0$ is artificially zeroed out from the output signal by an auto zero unit. This procedure is similar to "off-set" voltage and can be done automatically. Once the constant $a_0$ is eliminated from Eq. 2, the measured CVA output signal (left hand side of the equation) becomes a linear function of $\tau_w^{1/3}$, the third power of the shear stress. The change in CVA output power with changes in flow conditions is then directly proportional to the change in surface shear stress.

Correlation of Loads to CAFFI

The methods of the present invention require correlation of loads to quantitative on-surface CAFFI measurements.

Such correlations are obtained and validated by conducting tests to measure:

Surface pressure distribution and structural response;

Loads and moments generated during maneuvers of interest (derived from pressure measurements and strain gage data); and CAFFI locations based on measurable boundary-layer phenomena and surface shear stress distribution (using an array of micro-thin, surface-mounted hot-film sensors and a constant voltage anemometer system).

These measurements are used to:

1 Establish unique correlation between surface signatures (i.e., CAFFIs) and unsteady aerodynamic loads and moments;

2 Develop a mathematical model to tie together surface signatures and unsteady aerodynamic loads and moments; and 3 Develop a phenomenon-based robust sensing (PRS) system for real-time quantitative unsteady aerodynamic load measurements (QUALM).

Mathematical formulation of the problem for unsteady flows is based on the pioneering works of M. G. Goman and A. N. Khrabov. The state-space representation they described is:

$$\tau_1 \frac{dx}{dt} + x = x_0(\alpha - \tau_2 \dot{\alpha}) \qquad \text{Eq. 3}$$

where $x_o$ is the steady state dependency of vortex breakdown (VB) point (separation point (SP) for conventional wings) on the angle-of-attack, $\alpha$ is the angle-of-attack, $\tau_1$ is the relaxation time constant which defines the transient aerodynamic effects (i.e., dynamic properties of the VB (SP) flow adjustment when a flow condition is changed). $\tau_2$, is the total time delay of the VB (SP) and reattachment due to quasi-steady aerodynamic effects such as the circulation and boundary layer convection lags. The driving function $x_o$ is the steady state location of the VB (SP). This is generally a nonlinear function of the angle-of-attack and is usually obtained from wind tunnel tests.

The output equation for lift coefficient is:

$$C_L(\alpha, x) = \pi/2 \, (A \sin \alpha \cos^2 \alpha + x^2 \pi \sin^2 \alpha \cos \alpha) \qquad \text{Eq. 4}$$

where, x corresponds to instantaneous location of VB point on a delta wing. Similar expressions are used for drag and moment coefficients for conventional and delta-wing configurations.

Aerodynamic variables may be expanded in Taylor series around a steady-state value. Fan and Lutze (1996) expressed the aerodynamic coefficients and the derivatives as a polynomial (the subscript o indicates conditions at zero angle-of-attack in steady state flow):

$$C_D = C_{D0} + C_{D\alpha}(x)\alpha + C_{Dq}(x)q + \Delta^2 C_D = C_{Do} + (a_o + a_1 x + a_2 x^2)\alpha + a_3 \alpha^2 + (a_4 + a_5 x + a_6 x^2)q \qquad \text{Eq 5}$$

$$C_L = C_{L0} + C_{L\alpha}(x)\alpha + C_{Lq}(x)q + \Delta^2 C_L = C_{Lo} + (b_o + b_1 x + b_2 x^2)\alpha + b_3 \alpha^2 + (b_4 + b_5 x + b_6 x^2)q \qquad \text{Eq. 6}$$

$$C_m = C_{m0} + C_{m\alpha}(x)\alpha + C_{mq}(x)q + \Delta^2 C_m = C_{mo} + (c_o + c_1 x + c_2 x^2)\alpha + c_3 \alpha^2 + (c_4 + c_5 x + c_6 x^2)q \qquad \text{Eq. 7}$$

Here, $C_D$ is the drag coefficient, $C_L$ is the lift coefficient, $C_m$, is the pitching moment coefficient, $\alpha$ is the angle-of-attack and q is the pitch rate.

In the above state-space model given by equations (3–7), the unknown parameters in the dynamic equation (3) are the two time constants, which can be obtained through parameter estimation techniques using a large amount of experimental data at various unsteady flow conditions. The equation (3) is then integrated at each condition to obtain relevant value of x. The unknown parameters in the coefficient equations (5–7) are the force and moment coefficients at zero angle-of-attack in steady-state flow and the quadratic polynomial coefficients in the determination of aerodynamic derivatives. Goman and Khrabov and Fan and Lutze validated these equations for a number of representative cases involving flow separation and vortex breakdown using wind tunnel measurements of an airfoil, a flat delta wing, and a realistic aircraft configuration. It has thus been established that it is possible to obtain aerodynamic coefficients in unsteady flows in terms of the inner state variable x.

The Goman and Khrabov model requires extensive steady-state and unsteady aerodynamic wind tunnel testing to obtain the inner state variable x as a function of the input variables and the two time constants. However, the systems and methods of the present invention may be used to directly obtain both x and $\alpha$ in real time. This completely eliminates the use of equation 3 and, therefore, the need to obtain time constants through extensive unsteady wind tunnel testing and data analysis.

Figure 10:
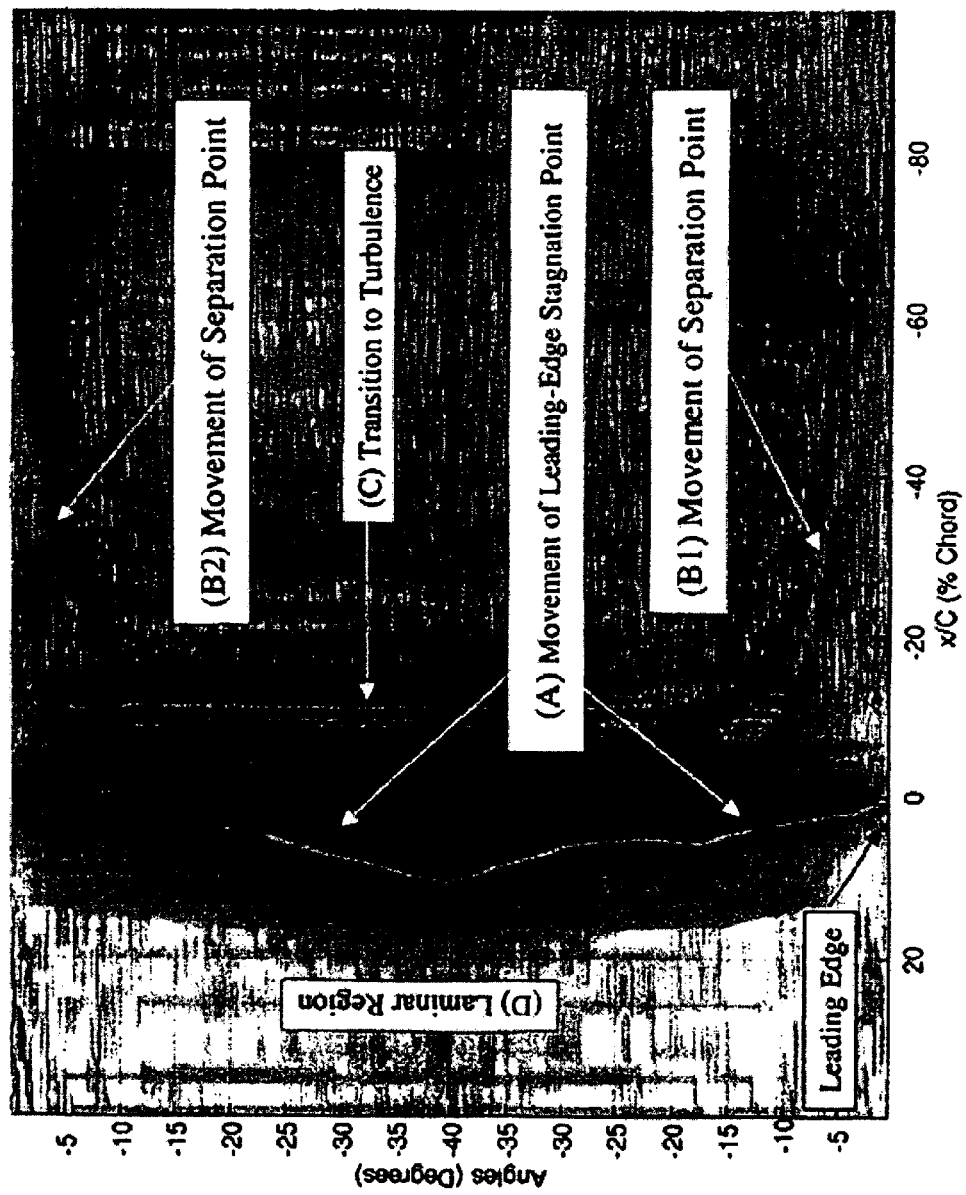
FIG. 10 is a graphical representation of a composite plot of raw constant voltage anemometer signals from a plurality of hot-film sensors on an airfoil during a pitching maneuver test.

Some results from recent experiments on a pitching airfoil are shown in FIG. 10. In FIG. 10, the instantaneous location and movement of the LESP can be seen. The LESP moves from the leading edge at 0-degree angle to about 10% chord at high angles. The chord length on the lower surface is expressed in the positive scale for convenience. Flow separation occurred on the upper surface. Its location and movement are shown at the left bottom (B1) and top (B2). The separation point is located at about 36% chord at an angle of attack of 6 degrees and moves towards the leading edge. During the pitch-up maneuver, the leading-edge separation occurs at about 16 degrees while during the pitch-down maneuver it occurs at about 12 degrees. The flow remained attached on the lower surface through the 0 to +40-degree pitch-up and +40-degrees to 0-degrees pitch-down maneuvers. The only region of interest on the lower surface is the laminar-to-turbulent transition at C. The darker areas indicate regions of relatively higher shear stress. The maximum shear stress occurs at transition. The laminar region at D and the turbulent regions are easily observed.

Figure 11:
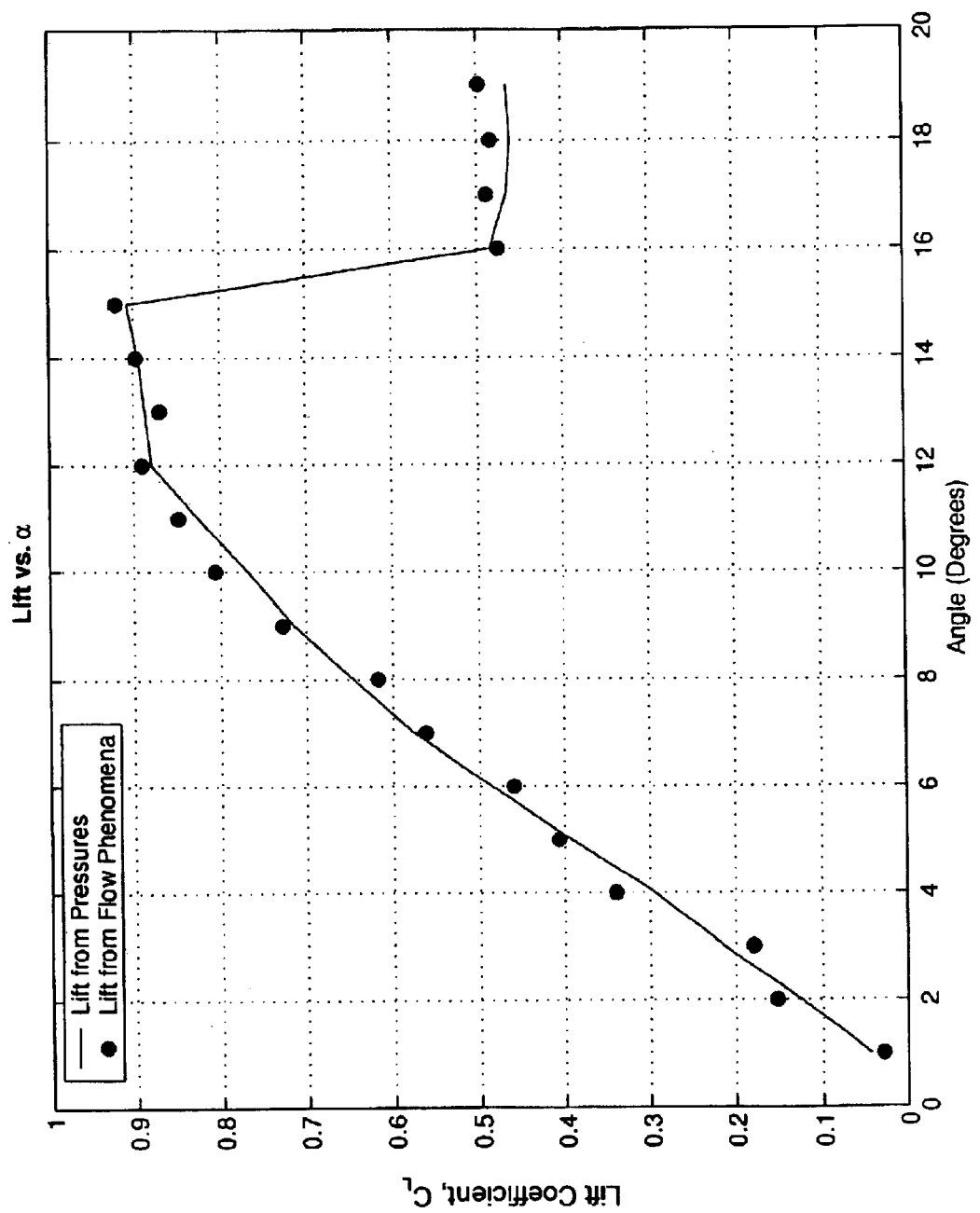
FIG. 11 is a graphical representation of the variation in lift coefficient and leading edge stagnation point location versus angle of attack for an exemplary airfoil.

The variation of lift coefficient (obtained from pressure distribution) with angle of attack is shown in FIG. 11 for steady-state conditions. The stagnation point location at each angle is depicted by filled circles. The LESP almost exactly follows the variation of lift coefficient with angle of attack. This allows the determination of section lift coefficient as a function of the instantaneous stagnation point location.

Figure 12:
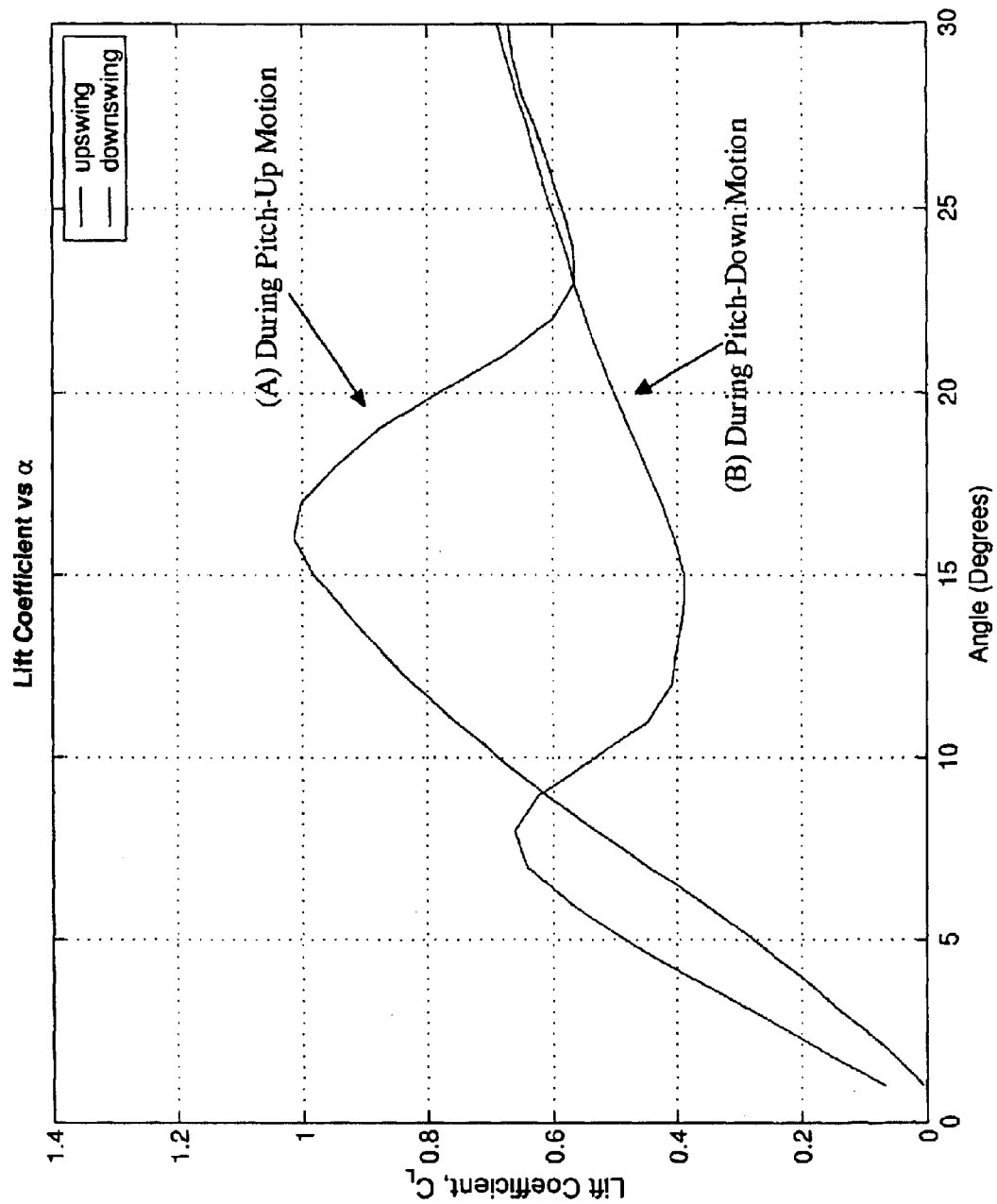
FIG. 12 is a graphical representation of the variation in lift coefficient versus angle of attack for an exemplary airfoil during pitch-up and pitch-down maneuvers.
Figure 13:
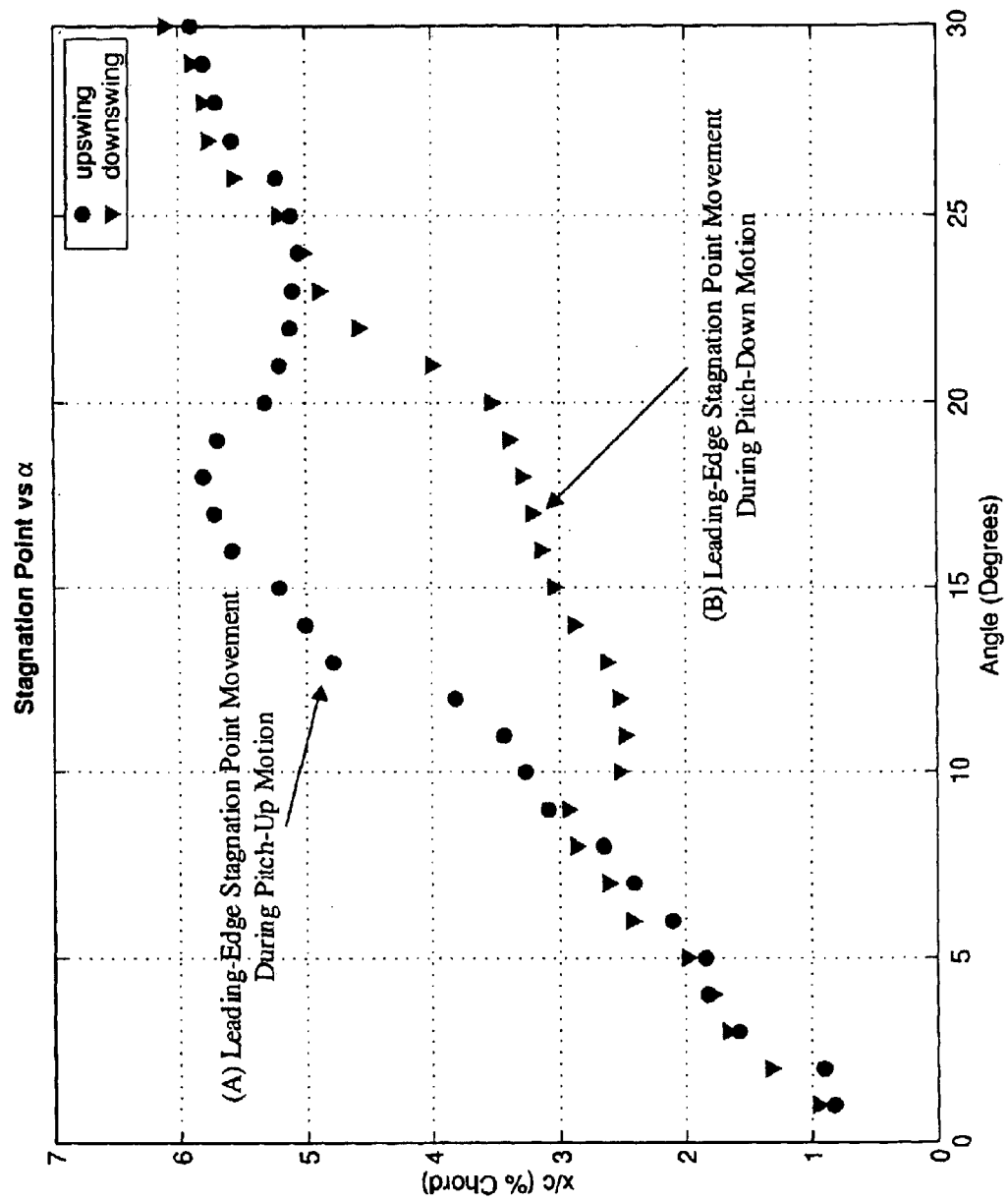
FIG. 13 is a graphical representation of leading edge stagnation point location versus angle of attack for an exemplary airfoil during pitch-up and pitch-down maneuvers.

FIG. 12 shows how lift coefficient changes during pitch-up and pitch-down motion of the airfoil. FIG. 13 shows that LESP location follows the same pattern, indicating a unique relationship between lift coefficient and LESP.

Figure 14:
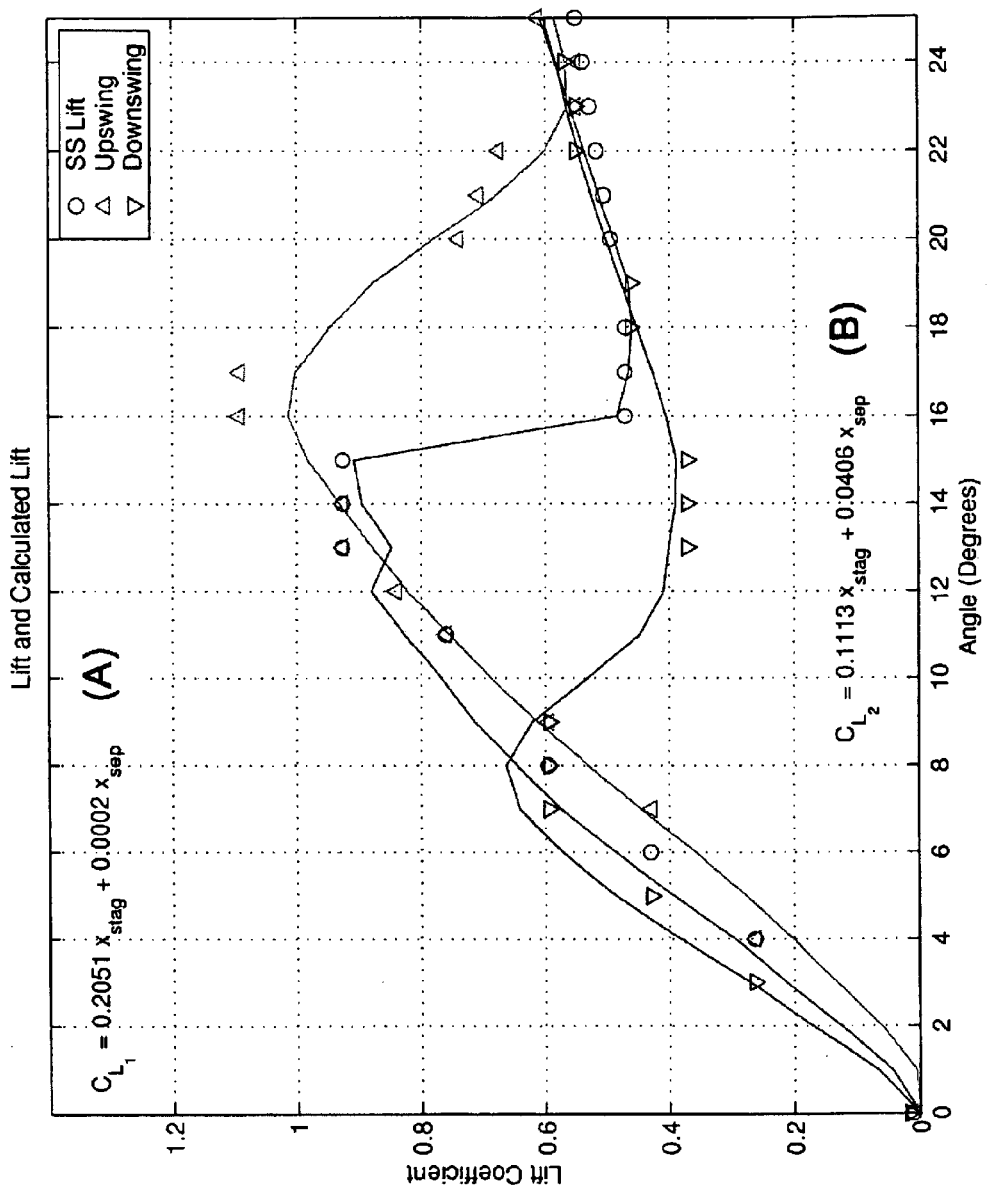
FIG. 14 is a graphical representation of the variation in lift coefficient versus angle of attack for an exemplary airfoil under steady state conditions and during pitch-up and pitch-down maneuvers.
Figure 15:
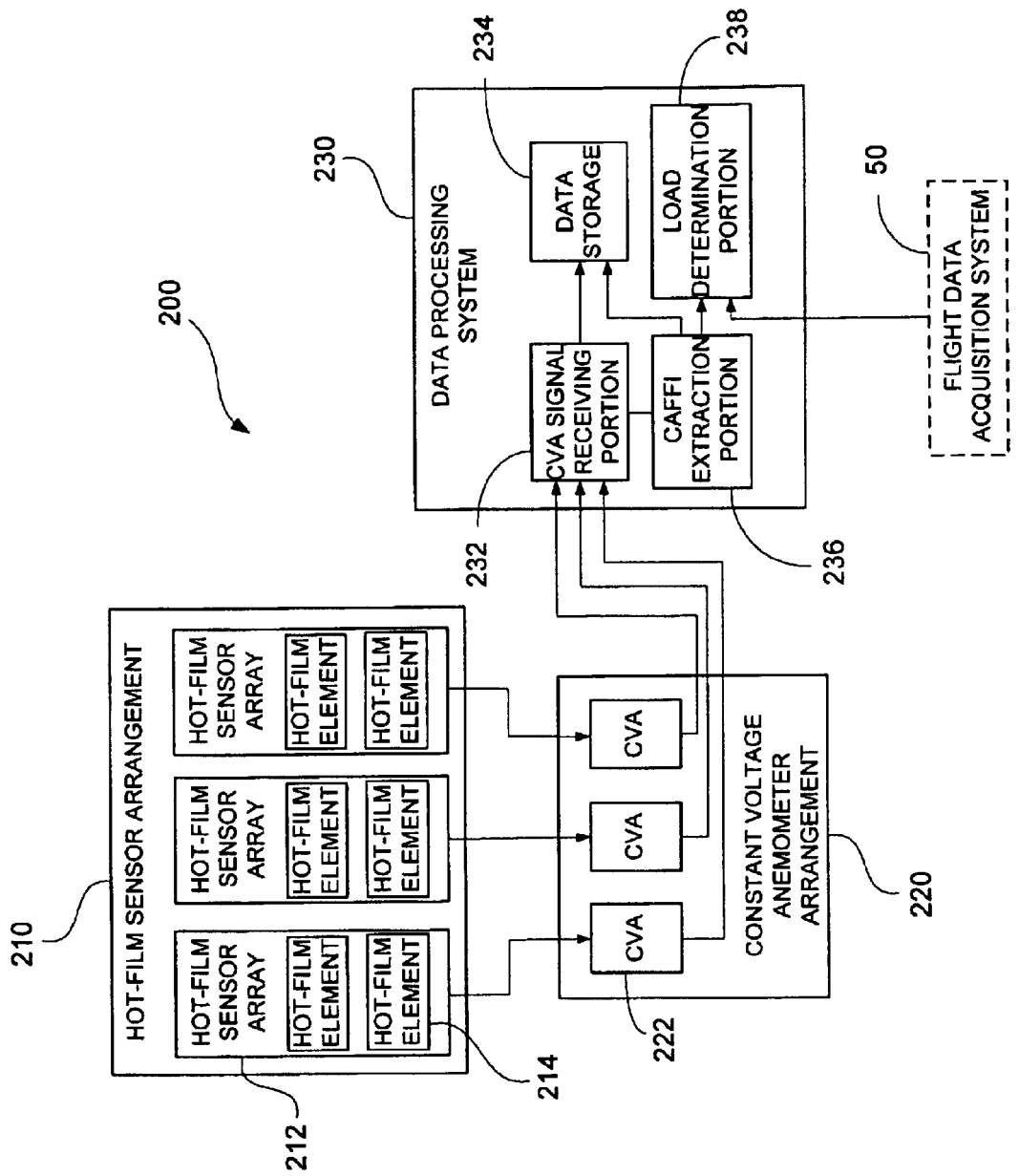
FIG. 15 is a block diagram of a load determination system according to an embodiment of the invention.

FIG. 14 is a composite plot showing the variation in lift coefficient at steady state, pitch-up, and pitch-down motions. The polynomial expressions (A) and (B) shown in FIG. 14 were determined using the illustrated steady-state data points (open circles). The constants of equation (A) were obtained for pre-stall conditions and the constants of equation (B) were obtained from post-stall conditions. A correlation trace constructed from Equations (A) and (B) is shown for comparison with the data. Equations (A) and (B) were then used to obtain unsteady aerodynamic lift coefficients during pitch-up and pitch down motions of the airfoil model using instantaneous locations of CAFFI (LESP and FSP). The resulting traces are illustrated in FIG. 13 along with test data points (upward pointing and downward pointing triangles) obtained from conventional pressure measurements. The agreement is excellent, indicating that instantaneous hot-film surface signatures can be used to determine the lift generated by the airfoil under unsteady flow conditions. Similar expressions can be generated for drag and moment coefficients in terms of CAFFI.

These data demonstrate the existence of excellent correlation between flow phenomena (CAFFI) and the aerodynamic force generated by the airfoil. The increase and decrease in lift coefficient in the pitch-up and pitch-down motions correlate well with the movement of the LESP during the same maneuver. Similar results on separation point movement are available but not shown here. These important aerodynamic phenomena can be used to generate a mathematical correlation between aerodynamic forces and CAFFI. The most significant advantage of this approach is that it is possible to obtain all these information in real time both in ground and flight-tests, under steady and unsteady flow conditions. Such enabling tools makes it possible to develop advanced automatic/active flight control systems.

System for Determining Unsteady Aerodynamic and Hydrodynamic Loading

With reference to the schematic representation shown in FIG. 13, a load determination system 200 according to an embodiment of the present invention is structured to use mathematical models relating CAFFI to aerodynamic (or hydrodynamic) forces and moments to make real time determinations of the forces on a body in an unsteady flow environment. The models used may be developed using the above described testing and data correlation methodologies. The load determination system 200 includes a hot-film sensor arrangement 210, a constant voltage anemometer arrangement 220 and a data processing system 230.

The hot-film sensor arrangement 210 comprises one or more hot-film sensor arrays 212, each of which comprises at least one hot-film sensor element 214 positioned on a surface of the body. The hot-film sensor elements 214 may be of the type formed from a thin metal film layer deposited on an insulated substrate as previously described. The metal film material may be nickel or platinum or other materials with a high and preferably linear changes in temperature coefficient of resistance. The metal film layer is advantageously formed with a thickness less than about 6 microns and preferably in a range from about 4.5 to about 5.5 microns and most preferably in a range from about 4.9 microns to about 5.1 microns. Other thicknesses may be used but may result in degradation of results or loss of integrity. The hot film sensor arrays 212 further comprise a plurality of conductive leads formed on the insulated substrate. The conductive lead material may be copper, gold or other highly conducting materials. The insulated substrate may be formed from a pliable insulated sheet material that can be used to conform the hot film sensor arrays 212 to surface contours. In some embodiments, however, it may be possible to form the hot film sensor elements in situ on the surface of an object to be characterized.

It will be understood that the precision with which CAFFI locations can be identified, and thus, the accuracy of the load determinations made from them, will depend on the number and spacing of the hot-film-sensor arrays 212 and elements 214. In an ideal case, sensor arrays 212 would be spaced around the entire surface of a body with closer spacing in areas on the body that are expected to experience CAFFIs that will correlate to dynamic loads. As previously discussed, these will typically be those areas associated with stagnation points and/or flow bifurcation points. If full body coverage is impractical, sensors may be placed in only the expected critical areas of the body.

The constant voltage anemometer arrangement 220 may be positioned in or near the instrumented body. In typical flight vehicles, the CVAs 222 of the constant voltage anemometer 220 may be positioned in disparate locations around the vehicle or may be centrally co-located. Each hot film sensor element 214 is in electrical communication with a corresponding CVA 222 of the constant voltage anemometer arrangement 220. Each CVA 222 is of the type previously described adapted for producing a signal based on the heat transfer from the hot-film sensor elements 214 to the fluid stream flowing around the body. For the same input power, CVA provides higher sensitivity (large signal-to-noise ratio) and larger bandwidth (high frequency content) signals compared to conventional thermal anemometers.

Each CVA 222 of the constant voltage anemometer arrangement 220 is in communication with the data processing system 230. It will be understood that the data processing system 230 may be in the form of a computer or computer system. The term "computer system" or "operating system" is to be understood to include at least one processor utilizing a memory or memories. The memory stores at least portions of an executable program code at one time or another during operation of the processor. In addition, the processor executes various instructions included in that executable program code. An executable program code means a program in machine language or other language that is able to run in a particular computer system environment to perform a particular task. The executable program code process data in response to commands by a user. As used herein, the terms "executable program code" and "software" are substantially equivalent.

It should also be appreciated that to practice the systems and methods of the invention, it is not necessary that the processor, or portions of the processor, and/or the memory, or portions of the memory be physically located in the same place or co-located with the instrumented body. Each of the processor and the memory may be located in geographically distinct locations and connected so as to communicate in any suitable manner, such as over a wireless communication path, for example. Each of the processor and/or the memory may also be composed of different physical pieces of equipment. It is not necessary that the processor be one single piece of equipment in one location and that the memory be another single piece of equipment in another location. The processor may be two pieces of equipment in two different physical locations connected in any suitable manner. Additionally, each respective portion of the memory described above may include two or more portions of memory in two or more physical locations, including or utilizing memory stores from the Internet, an Intranet, an Extranet, a LAN, a WAN or some other source or over some other network, as may be necessary or desired.

Software enables the data processing system 230 to perform the operations required by the methods of the invention and may be supplied on any of a wide variety of data holding media. The implementation and operation of the invention may be in the form of computer code written in any suitable programming language, which provide instructions to the computer. It should further be appreciated that the software code or programming language that is used in the data processing system 230 to may be provided in any of a wide variety of forms. Illustratively, the software may be provided in the form of machine language, assembly code, object code, source language, flash application or other program that is interpreted by a user's browser, as well as in other forms. The software may be in the form of compressed or encrypted data utilizing a known compression format or encryption algorithm.

It should also be appreciated that the particular software medium used by the data processing system 230 may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system. Accordingly, the software used in operation of the data processing system 230 may be provided in the form of a hard disk or be transmitted in some form using a direct wireless telephone connection, the Internet, an Intranet, or a satellite transmission, for example. Further, the programming language enabling the system and method of the invention as described above may be used on all of the foregoing and any other medium by which software or executable program code, such as a flash application, may be communicated to and utilized by a computer or other operating system.

The data processing system 230 comprises a CVA signal receiving portion 232, a data storage portion 234, a CAFFI extraction portion 236 and a load determination portion 238. The CVA signal receiving portion 232 is in communication with each of the CVAs 222 of the constant voltage anemometer arrangement 220 for receiving CVA signals therefrom. The CVA signals may be selectively amplified as required. The raw signals from the CVAs 222 may be stored in the data storage 234 for later processing and/or passed to the CAFFI extraction portion 236 of the data processing system 230 if immediate load determination is required. The CAFFI extraction portion 236 may be programmed to digitize and correlate CVA signal data from one or more bot-film sensor arrays 212 and extract CAFFI locations using the previously described signal characteristics for the various CAFFI phenomena. Identified CAFFIs may then be passed to the load determination portion 238.

The load determination portion 238 may be programmed with previously determined dynamic load correlations that allow determination of load and moment coefficients as functions of CAFFI location. These correlations are used with the real time CAFFI locations provided by the CAFFI extraction portion 236 to determine real time load and moment coefficients for the body or a portion of the body. Local or overall flight conditions (e.g., fluid flow velocity, fluid density, etc. received, for example, from a vehicle's flight data acquisition system 50) may be used in conjunction with the load and moment coefficients to determine real time loads and moments for the instrumented object or portions of the instrumented object.

The loads and moments provided by the load determination module 238 are virtually instantaneously calculated and can be displayed or stored. A particular advantage of the real time determination of these loads, however, is as part of the control system of a vehicle. An aircraft flight control system, for example, may be programmed to use information from the data processing system 230 to determine and transmit to control surfaces of the aircraft commands intended to respond to the loads being experienced. Because the data processing system can provide virtually instantaneous information on loads and CAFFI location, the flight control system can act immediately to alleviate high loading or other undesirable conditions.

It will be understood by those of ordinary skill in the art that the systems and methods of the invention may be applied to any object or vehicle immersed in a fluid stream and are particularly adaptable for use in flight vehicles and watercraft. The invention may be applied to vehicles in their entirety or to particular structures including but not limited to hulls, wings, rudders, stabilizers, rotors and control surfaces. The invention may also be applied to scale models or portions of models for testing in wind tunnel or hydrodynamic simulation test facilities.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It will be understood that the present invention may be practiced by adding additional steps to the method, omitting steps within the process, and/or altering the order in which the steps are performed in the process.

Accordingly, while the present invention has been described here in detail in relation to its preferred embodiment, it is to be understood that this disclosure is only illustrative and exemplary of the present invention and is made merely for the purposes of providing a full and enabling disclosure of the invention. Many modifications to the embodiments described above can be made without departing from the spirit and scope of the invention. Accordingly, the foregoing disclosure is not intended to be construed or to limit the present invention or otherwise to exclude any other such embodiments, adaptations, variations, modifications and equivalent arrangements.

What is claimed is:

1. A method for determining a load on an object immersed in a fluid stream under a set of flow and attitude conditions associated with unsteady flow phenomena, the method comprising:

measuring surface heat transfer at a plurality of surface locations on the object under the flow and attitude conditions to provide a set of heat transfer data;

determining an indicator surface location of at least one critical flow feature indicator using the heat transfer data;

calculating a load coefficient using the indicator surface location of the at least one critical flow feature indicator; and calculating the load from the load coefficient and the flow and attitude conditions.

2. A method determining a load according to claim 1 further comprising:

measuring surface heat transfer at the plurality of surface locations on the object under a plurality of steady state flow and attitude conditions to provide a set of correlation heat transfer data;

determining a steady state indicator surface location of the at least one critical flow feature indicator for each of the plurality of steady state flow and attitude conditions using the correlation heat transfer data;

determining steady state loads on the object at each of the plurality of steady state flow and attitude conditions using at least one of pressure data, mechanical balance measurements and structural response data;

correlating the steady state loads and the steady state indicator surface locations of the least one critical flow feature indicator; and constructing the mathematical model using the correlated steady state loads and the steady state indicator surface locations of the least one critical flow feature indicator.

3. A method according to claim 1 wherein the at least one critical flow feature indicator includes at least one of a stagnation point, a point of transition from laminar to turbulent flow and a flow bifurcation point.

4. A method according to claim 1 wherein the at least one critical flow feature indicator includes at least one of a flow separation point, a flow reattachment point, a point of vortex formation onset and a point of vortex shedding onset.

5. A method for determining a load according to claim 1 further comprising:
providing a mathematical model relating load coefficient to indicator surface location of one or more critical flow feature indicators.

6. A method for determining a load according to claim 5 wherein the action of calculating a load coefficient includes applying the mathematical model to the indicator surface location of the at least one critical flow feature indicator to calculate the load coefficient.

7. A method for determining a load according to claim 1 wherein the action of measuring surface heat transfer is accomplished using at least one thin film sensor array applied to a surface of the object, the thin film sensor array being in electrical communication with at least one constant voltage anemometer configured to provide signals relating to heat transfer from the thin film sensor array to the fluid stream.

8. A method for determining a load according to claim 7 wherein the at least one thin film sensor array comprises a plurality of hot-film sensor elements, each element configured and positioned to provide heat transfer information at one of the plurality of surface locations on the object and being in communication with an associated constant voltage anemometer.

9. A method according to claim 8 wherein the action of determining an indicator surface location of at least one critical flow feature indicator using the heat transfer data includes:
receiving sensor signals from each associated constant voltage anemometer; and
comparing the sensor signals associated with proximately located hot-film sensor elements to identify and locate occurrences of critical flow feature indicators.

10. A load determination system for determining unsteady loads on an object immersed in a fluid stream under a set of flow and attitude conditions, the load determination system comprising:
sensor means for measuring surface heat transfer at a plurality of surface locations on the object under the flow and attitude conditions to provide a set of heat transfer data, at least a portion of the sensor means being appliable to a surface of the object;
indicator determining means for determining an indicator surface location of at least one critical flow feature indicator using the heat transfer data, the indicator determining means being in communication with the sensor means;
first processing means for calculating a load coefficient using the indicator surface location of the at least one critical flow feature indicator, the first processor means being in communication with the indicator determining means; and
second processing means for calculating the load from the load coefficient and the flow and attitude conditions, the second processor means being in communication with the first processing means.

11. A load determination system according to claim 10 wherein the first processing means includes means for applying a mathematical model to the indicator surface location of the at least one critical flow feature indicator to calculate the load coefficient.

12. A load determination system according to claim 10 wherein the sensor means includes at least one thin film sensor array that is appliable to a surface of the object, the thin film sensor array being in electrical communication with at least one constant voltage anemometer configured to provide signals relating to heat transfer from the thin film sensor array to the fluid stream.

13. A load determination system according to claim 10 wherein the at least one critical flow feature indicator includes at least one of a stagnation point, a point of transition from laminar to turbulent flow and a flow bifurcation point.

14. A load determination system according to claim 10 wherein the at least one critical flow feature indicator includes at least one of a flow separation point, a flow reattachment point, a point of vortex formation onset and a point of vortex shedding onset.

15. A load determination system according to claim 10 wherein the at least one thin film sensor array comprises a plurality of hot-film sensor elements, each element being positionable to provide heat transfer information at one of the plurality of surface locations on the object and being in communication with an associated constant voltage anemometer.

16. A load determination system according to claim 15 wherein the first processing means includes:
means for receiving sensor signals from each associated constant voltage anemometer; and
means for comparing the sensor signals associated with proximately located hot-film sensor elements to identify and locate occurrences of critical flow feature indicators.

17. A load determination system for determining a load on an object immersed in a fluid stream under a set of flow and attitude conditions, the load determination system comprising:
a hot film sensor arrangement having at least one hot-film sensor array appliable to a surface of the object, each of the at least one sensor array having a plurality of hot-film sensor elements;
a constant voltage anemometer arrangement having a plurality of constant voltage anemometer circuits each constant voltage anemometer circuit being in communication with an associated hot film sensor element and being configured to provide a signal corresponding to heat transfer from the associated hot film sensor to the fluid stream;
a data processing system in communication with the constant voltage anemometer arrangement;
a signal receiving portion in the data processing system, the signal receiving portion being in communication with the constant voltage anemometer arrangement for receiving signals from the constant voltage anemometers;
a critical flow feature indicator extraction portion in the data processing system, the critical flow feature indicator extraction portion being in communication with the signal receiving portion and having software for processing the signals to identify the location of one or more critical flow features on the surface of the object; and and a load determination portion in the data processing system, the load determination portion being in communication with the critical flow feature indicator extraction portion and having software for calculating a load magnitude for at least one load on the object using the location of one or more critical flow features.

18. A load determination system according to claim 17 wherein the software for calculating loads includes a mathematical model that can be applied to the indicator surface location of the at least one critical flow feature indicator to calculate a load coefficient.

19. A load determination system according to claim 17 wherein the software for calculating loads is configured to use flow condition and object attitude information to calculate the load magnitude of the at least one load using the load coefficient.

20. A load determination system according to claim 17 wherein the one or more critical flow features includes at least one of a stagnation point, a point of transition from laminar to turbulent flow and a flow bifurcation point.

21. A load determination system according to claim 17 wherein the one or more critical flow features includes at least one of a flow separation point, a flow reattachment point, a point of vortex formation onset and a point of vortex shedding onset.

22. A load determination system according to claim 17 wherein the object is a vehicle having a flow condition and attitude data acquisition system and an attitude control system, the load determination portion being in communication with the data acquisition system for receiving flow condition and attitude information therefrom and being in communication with the control system for providing the load magnitude of the at least one load thereto.

23. A load determination system according to claim 17 wherein the hot-film sensor elements each comprise a thin metal sensor layer having a material thickness less than about 6 microns.

24. A load determination system according to claim 23 wherein the material thickness of the metal sensor layer is in a range from about 4.5 microns to about 5.5 microns.

25. A load determination system according to claim 23 wherein the metal sensor layer is formed from nickel deposited on an insulated substrate.

26. A load determination system for determining a load on a vehicle immersed in a fluid stream under a set of flow and attitude conditions, the vehicle having a flow condition and attitude data acquisition system, an attitude control system and attitude control surfaces, the load determination system comprising:

a hot film sensor arrangement having at least one hot-film sensor array appliable to a surface of the vehicle, each of the at least one sensor array having a plurality of hot-film sensor elements;

a constant voltage anemometer arrangement having a plurality of constant voltage anemometer circuits each constant voltage anemometer circuit being in communication with an associated hot film sensor element and being configured to provide a signal corresponding to heat transfer from the associated hot film sensor to the fluid stream;

a data processing system in communication with the constant voltage anemometer arrangement;

a signal receiving portion in the data processing system, the signal receiving portion being in communication with the constant voltage anemometer arrangement for receiving signals from the constant voltage anemometers;

a critical flow feature indicator extraction portion in the data processing system, the critical flow feature indicator extraction portion being in communication with the signal receiving portion and having software for processing the signals to identify the location of one or more critical flow features on the surface of the vehicle; and and a load determination portion in the data processing system, the load determination portion being in communication with the critical flow feature indicator extraction portion, the flow condition and attitude data acquisition system and the an attitude control system and having software for calculating a load magnitude for at least one load on the vehicle using the location of one or more critical flow features.

27. A load determination system according to claim 26 wherein the software for calculating loads includes a mathematical model that can be applied to the indicator surface location of the at least one critical flow feature indicator to calculate a load coefficient.

28. A load determination system according to claim 27 wherein the software for calculating loads is configured to use flow condition and vehicle attitude information to calculate the load magnitude of the at least one load using the load coefficient.

29. A load determination system according to claim 27 wherein the one or more critical flow features includes at least one of a stagnation point, a point of transition from laminar to turbulent flow and a flow bifurcation point.

30. A load determination system according to claim 27 wherein the one or more critical flow features includes at least one of a flow separation point, a flow reattachment point, a point of vortex formation onset and a point of vortex shedding onset.

31. A load determination system according to claim 27 wherein the vehicle is one of an aircraft and a watercraft.

32. A load determination system according to claim 27 wherein the hot-film sensor elements each comprise a thin metal sensor layer having a material thickness less than about 6 microns.

33. A load determination system according to claim 32 wherein the material thickness of the metal sensor layer is in a range from about 4.5 microns to about 5.5 microns.

34. A load determination system according to claim 32 wherein the metal sensor layer is formed from nickel deposited on an insulated substrate.

* * * * *

UNITED STATES PATENT AND TRADEMARK OFFICE
CERTIFICATE OF CORRECTION

PATENT NO. : 6,826,493 B1
DATED : November 30, 2004
INVENTOR(S) : Siva M. Mangalam It is certified that error appears in the above-identified patent and that said Letters Patent is hereby corrected as shown below:

<u>Title page,</u>
Item [54], Title, should read -- SYSTEM AND METHOD FOR REAL TIME DETERMINATION OF UNSTEADY AERODYNAMIC AND HYDRODYNAMIC LOADS --

Signed and Sealed this

Tenth Day of May, 2005

JON W. DUDAS
*Director of the United States Patent and Trademark Office*